United States Patent
Laski et al.

(10) Patent No.: US 10,056,018 B1
(45) Date of Patent: Aug. 21, 2018

(54) DYNAMIC COLOR RENDERING METHODS AND SYSTEMS PROVIDING JUST-NOTICEABLE COLOR ACCENTUATION AND QUASI-ANIMATION EFFECTS

(71) Applicants: Joseph Laski, Stoneham, MA (US); Charles Brunault, South Hamilton, MA (US); Seung Cheol Ryu, Marblehead, MA (US); Rebecca Schmidt, Chelmsford, MA (US)

(72) Inventors: Joseph Laski, Stoneham, MA (US); Charles Brunault, South Hamilton, MA (US); Seung Cheol Ryu, Marblehead, MA (US); Rebecca Schmidt, Chelmsford, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/676,361

(22) Filed: Aug. 14, 2017

(51) Int. Cl.
| | |
|---|---|
| H05B 33/08 | (2006.01) |
| G09F 19/20 | (2006.01) |
| F21S 10/06 | (2006.01) |
| F21S 10/02 | (2006.01) |
| H05B 37/02 | (2006.01) |
| G09F 13/00 | (2006.01) |

(52) U.S. Cl.
CPC ............ *G09F 19/20* (2013.01); *F21S 10/023* (2013.01); *F21S 10/066* (2013.01); *G09F 13/005* (2013.01); *H05B 33/0845* (2013.01); *H05B 37/0281* (2013.01)

(58) Field of Classification Search
CPC .... H05B 37/02; H05B 37/0281; H05B 33/08; H05B 33/0845; G09F 19/20; G09F 13/005; F21S 10/023; F21S 10/066
USPC ........ 315/151–158, 185 R, 209 R, 210, 291, 315/294, 307, 308, 312
See application file for complete search history.

(56) References Cited

U.S. PATENT DOCUMENTS

2010/0066260 A1\* 3/2010 Newman, Jr. ...... H05B 33/0845
315/246

\* cited by examiner

*Primary Examiner* — Jimmy Vu
(74) *Attorney, Agent, or Firm* — Yutian Ling

(57) ABSTRACT

Lighting methods and systems to enhance the browsing behaviors of shoppers in a manner intended to be primarily subconscious include illumination of a targeted area, such as a typical retail display, with a tunable spectrum lamp that slowly cycles through different illumination spectra such that color rendering of illuminated target is deliberately varied for subtle arousal of the visual senses. The illumination spectra, and the rates at which spectral conditions are changed, are both chosen as such that multi-colored objects in the targeted area change in appearance in a barely noticeable way, such that shoppers may find their visual attention redirected, seemingly at random, to a wider variety of products on display. Color spectrum changes also may be controlled in coordination with predefined packaging colors to create quasi-animation effects.

20 Claims, 20 Drawing Sheets
(18 of 20 Drawing Sheet(s) Filed in Color)

DYNAMIC COLOR RENDERING METHODS AND SYSTEMS PROVIDING JUST-NOTICEABLE COLOR ACCENTUATION AND QUASI-ANIMATION EFFECTS

FIELD OF THE APPLICATION

The present application generally relates to the field of lighting technology, and more particularly to dynamic color rendering methods and systems providing just-noticeable color accentuation and quasi-animation effects.

BACKGROUND

In the modern retail setting, the use of technology to strengthen customer relationships and improve the customer experience, as well as make the day-to-day operations easier for merchants, is of ever-increasing importance. Lighting is one of the technology factors important in creating a shopping environment and experience: one that attracts shoppers, pulls them in, and creates a store personality while reflecting brand and identity. Well-designed retail lighting does not come in a one-size-fits-all package. It is a strategic blend of color, contrast, control, and energy efficiency. As lighting technology brings with it a multitude of opportunities and flexibility in color, effect and light intensity, the lighting design strategy in retail stores may evolve in line with the shopper-driven innovative culture of retail opportunities, and become aligned to various emotional and environmental contexts.

In general, retail lighting comprises two different types of lighting that can be considered as functionally opposite to each other. On one hand, it is concentrated accent lighting, and on the other, diffuse ambient lighting. Both have their applications in store lighting design—to enhance mood or atmosphere, or to focus attention on certain details and merchandise. The human eye reacts differently to variations in color, brightness, and the contrasts between them. As is known in the lighting arts, both accent and ambient lighting can be spectrally tuned using CCT (correlated color temperature) variations and RGB (red, green, blue) color-mixing technologies to affect in-store consumer behavior in a certain way. Dynamic control of RGB lighting can produce seamless changes in brightness and hue to create natural feelings of well-being. Moreover, with flexible settings, light can be adapted to different needs and moods, enhancing customers' shopping experience with ease.

While a variety of general lighting schemes are known and available, presently no dynamic "white light illumination" solution exists for mainstream retail display applications. Retail product packaging designers rely on the static white spectrum of ambient lighting fixtures and create color appearances solely by use of dyes and pigments in the packaging graphics. In general, much of the commercial use of dynamic color is highly theatrical in nature.

When one considers lighting schemes and effects, in particular color-tunable lighting schemes, it is important to have a basic understanding of color and color space. The CIE xy color space diagram, such as illustrated in FIG. 1A, is designed such that the curved horseshoe-shaped boundary corresponds to monochromatic light (ranging from blue to red). The straight edge at the bottom of the CIE xy diagram demonstrates the various shades of purple that can be formed by mixing blue and red, but does not represent any single wavelength of monochromatic light. See, e.g., Wyszecki & Stiles, Color Science, Concepts and Methods, Quantitative Data and Formulae, $2^{nd}$ Ed., Wiley 2000, Chapter 3.

Similar to the situation of mixing red and blue to get shades of purple, all colors on the interior of the CIE xy diagram are formed by mixing monochromatic wavelengths. This can be done either by mixing multiple monochromatic wavelengths of different colors (e.g. mixing blue and yellow to get white) or by sufficiently broadening the spectrum of illumination (which is essentially mixing monochromatic wavelengths that are spectrally adjacent to each other).

The CIE xy diagram is constructed in such a way that the mixing of any two colors will generate other colors that lie along a straight line connecting those two original colors. In the case of LED lighting, this can be demonstrated by independently powering, for example, a red LED and a green LED, such that decreasing the power on (dimming) one LED will alter the ratio of green photons to red photons, with the result of enabling the color perception of various shades of yellow and orange (even though no photons of "yellow" or "orange" wavelengths are present).

When three LED colors are independently powered (and optically mixed), all colors within the triangle formed by connecting those color points are possible. This is referred to as the "color gamut". A common example is the modern television or computer display, both of which are typically constructed such that each pixel contains three independently powered red, green and blue lighting elements. Powering all three colors together creates a perception of white. "Off-white", i.e. slightly color-tinted shades of white, can be generated by slightly changing the balance of red, green and blue color components.

SUMMARY OF THE DISCLOSURE

In one implementation, the present disclosure is directed to a method for providing just noticeable color accentuation for displays of multi-colored items. The method includes illuminating the display with a tunable spectrum lamp and controlling the tunable spectrum lamp to provide a periodic, repeating illumination cycle through different illumination spectra, the repeating illumination cycle having a period of not less than about 10 seconds.

In another implementation, the present disclosure is directed to a method for providing quasi-animation effects on displays of multi-colored items. The method includes illuminating the display with a tunable spectrum lamp, and controlling the tunable spectrum lamp to provide a periodic, repeating illumination cycle through different illumination spectra. The repeating illumination cycle has a period of not less than about 12 seconds, during which the lamp cycles through a combination of different red, blue and green illumination spectra. The repeating illumination spectra and the period are selected to cause an appearance of movement or flashing of labels or graphics with predetermined colors provided on items in the display. Also, a substantially time constant ambient white light illumination with the periodic, repeating illumination cycle may be superimposed on the ambient white light illumination.

In yet another implementation, the present disclosure is directed to a system providing just noticeable color accentuation for displays of multi-colored items. The system includes a tunable spectrum light source, and a light controller including a processor and memory, in which the processor executes instructions stored in the memory for controlling the tunable spectrum light source to provide a periodic, repeating illumination cycle through different illumination spectra, the repeating illumination cycle having a period of not less than about 10 seconds.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1A:
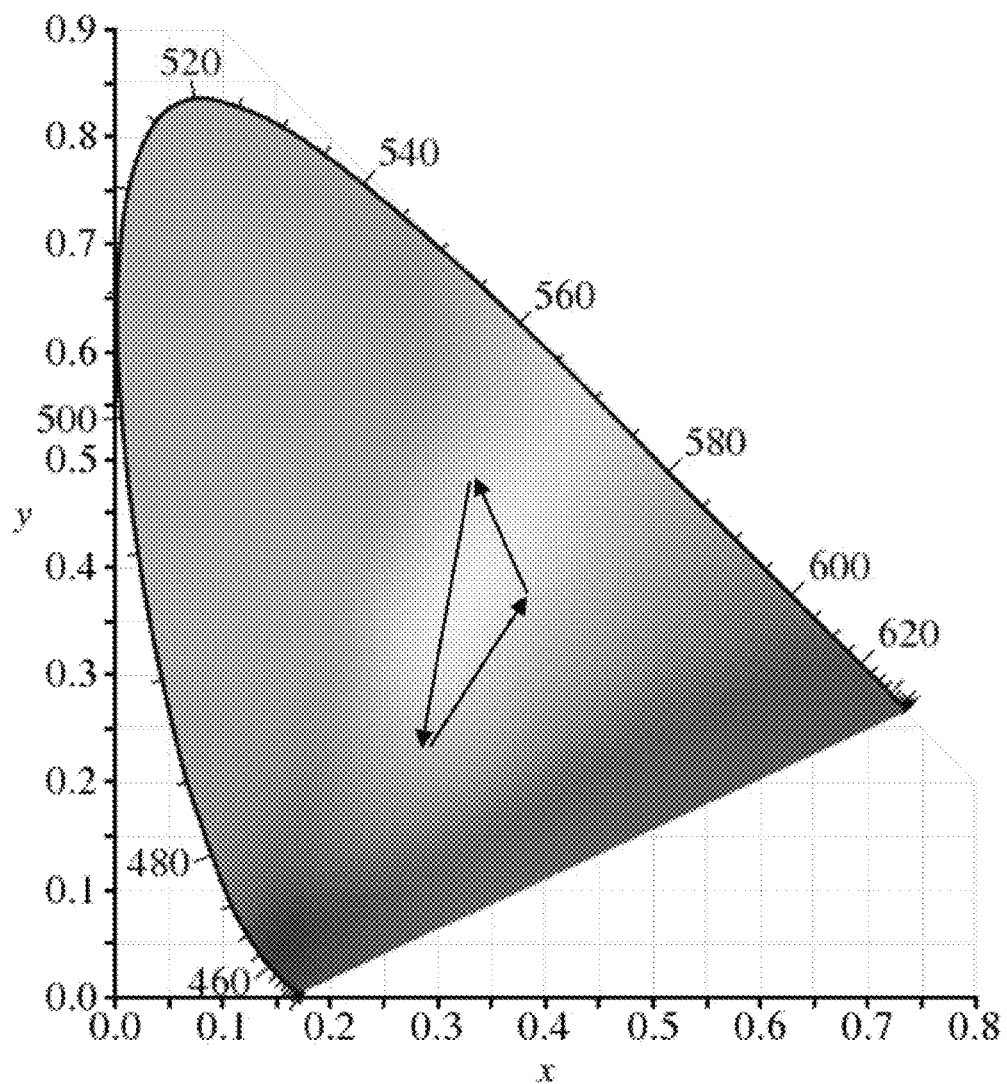
FIG. 1A is a CIE(1931) xy chromaticity diagram showing a color transition trajectory through the color space according to one embodiment of the present disclosure.

Embodiments described herein provide lighting methods and systems to enhance the browsing behaviors of shoppers in a manner intended to be primarily subconscious. In general, described methods and systems involve illumination of a targeted area, such as a typical retail display of colorful packaged merchandise, with a tunable spectrum lamp that slowly cycles through different illumination spectra such that color rendering of illuminated target is deliberately varied for subtle arousal of the visual senses. The illumination spectra, and the rates at which spectral conditions are changed, are both chosen as described herein such that colored objects (and multi-colored objects) in the targeted area will change in appearance in a "barely noticeable" way, such that shoppers may find their visual attention redirected, seemingly at random, to a wider variety of products on display.

As used herein, the term "color", when used to describe the light output from a lamp, is used interchangeably with the term "spectrum." However, the term, "color" generally is used to refer to a property of radiation that is perceivable by an observer (though this usage is not intended to limit the scope of this term). Accordingly, the term "different colors" implies two different spectra with different wavelength components and/or bandwidths. In addition, "color" may be used to refer to white and non-white light. It is acknowledged that two lamps with different spectral outputs may indeed exhibit the same perceived color, and thus be metamers, but such situations will be explicitly noted.

The terms "color rendering" or "rendering" refer to a measure of the quality of light emitted by a light source with regard to its ability to effectively reproduce the color of an illuminated object. It is also indicative of the spectral characteristics of the emitted light.

Use of a specific color to describe an LED or the light emitted by the LED refers to a peak or specific range of dominant wavelengths associated with the specific color. In particular, the dominant wavelength describes the basic hue of an otherwise monochromatic LED. While the calculation of dominant wavelength provides a quantitative scale of hue, linguistic descriptions of hue vary within language and within culture. For example, the term red is generally used to describe any LED with dominant wavelength above about 635 nm. The term "orange" when used to describe an LED or the light emitted by the LED means the LED emits light with a dominant wavelength of in the vicinity of 600 nm and the term "yellow" refers to light with a dominant wavelength of in the vicinity of 580 nm. The term "green" when used to describe an LED or the light emitted by the LED means the LED emits light with a dominant wavelength in the vicinity of 520 nm. The term "blue" when used to describe an LED or the light emitted by the LED generally means the LED emits light with a dominant wavelength below 480 nm.

The term "white" generally refers to white light with a correlated color temperature (CCT) between about 2600 and 8000 K, "cool white" generally refers to light with a CCT higher than 5000 K, which is more bluish in color, and "warm white" refers to white light with a CCT below about 3500 K, which is more yellowish in color. It is common to refer to CCT values between these limits (e.g. 4000 K) as "neutral white".

In general, in embodiments described herein, background ambient illumination may be provided by white light sources that emit a spectrum which is constant in time (e.g., ambient white light from LED sources or from conventional light sources such as fluorescent, HID, or halogen lamps), and the cycling of RGB is superimposed on the ambient lighting. In this manner, the overall white illumination spectrum is no longer constant in time but is transiently pulled to the red, to the green, and to the blue, such that it is always slightly "off white" as illustrated, for example, in FIG. 1A. FIG. 1A illustrates a simplified embodiment in which sequencing of the RGB light source is superimposed upon constant white ambient lighting. As a further illustrative example, the magnitude of the color shifting about the center "white point" may be considered as approximately to scale with reference to the x and y axes of the color diagram as presented in FIG. 1A. While under some circumstances the movement through the color space as indicated may appear to represent large color changes, by controlling the cycle speed as described herein these color rendering changes may be made in a manner that is just barely noticeable to the typical observer.

The frequency of cycling through changes in color rendering can range from "fast"—in the range of about 2-4 seconds—whereby color changes are intended to be noticeable (and perhaps even entertaining) to "slow"—in the range of about 10-24 seconds—whereby the changes are effectively in resonance with human saccade eye movements such that visual attention may be subconsciously attracted to new products. In some examples, relatively slow cycle speed of approximately 12 seconds may be employed. The goal is not to attract the shopper's attention to specific products, but rather to subtly and randomly shuffle the points of attention to expand the shopper's range of consideration. A scene that was once colorful but static, will now dynamically invite the observer's eyes to scan wider ranges of product selections as packaging labels take turns flashing just enough extra color to subconsciously draw the shopper's eyes. As the lamp transitions through specific spectral changes, the color rendering of objects may be affected such that some packaging graphics might be perceived as either changing in color or in apparent brightness, depending on the reflectivity spectrum of the packaging graphics. The technique is particularly suited for stimulating apparent movement in the observer's peripheral vision (or at least, off-center vision), inviting the observer to scan wider spatial ranges of a display shelf, rather than having vision locked into a singular focal point. In one implementation, variations in brightness or hue should be subtle such that observers can concentrate on a specific object within the target region, such as a single product on a shelf, when desired, but when concentration is withdrawn, just-noticeable (or just unnoticeable) off-center brightness/hue variations will draw the eyes 'here and there' to facilitate a random exploration of broader spatial ranges of the entire target region (e.g., a display shelf or other object presentation containing multiple objects for consideration).

Figure 1B:
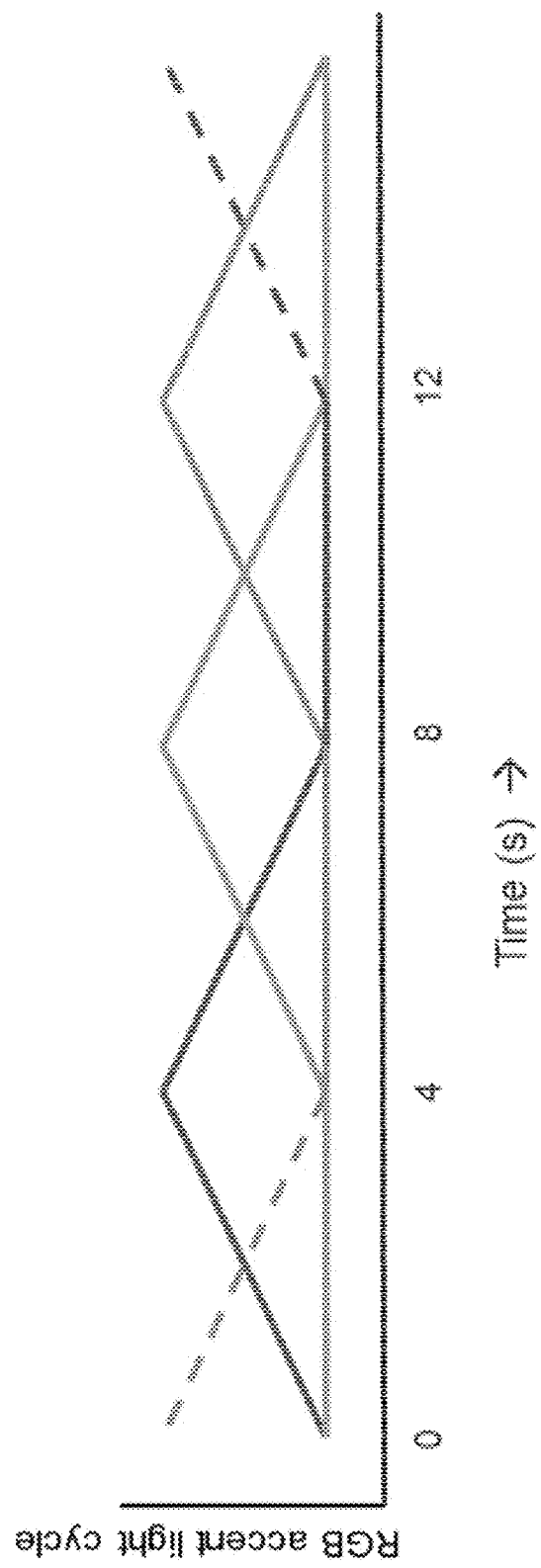
FIGS. 1B and 1C are timing plots illustrating transition cycle periods according to embodiments of the present disclosure.
Figure 1C:
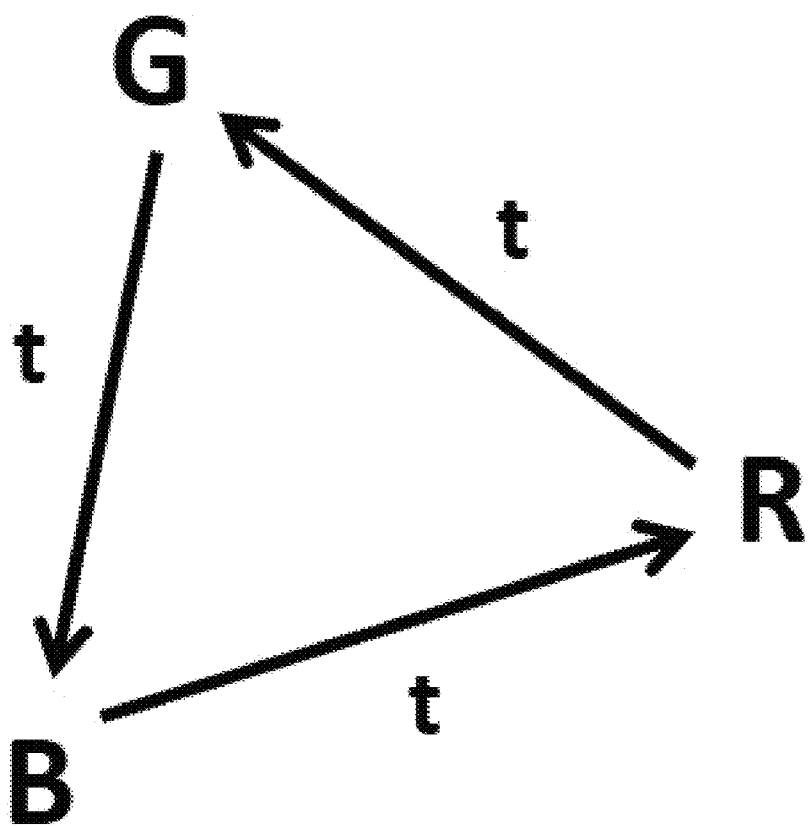

FIG. 1B illustrates an approximate RGB waveform cycling as illustrated in FIG. 1A with an approximate 12 second cycle period and in such a way that two color components are transitionally overlapping at any given time with brief, instantaneous peaks of single color accent. This cycle speed has been visually judged to be slow enough to be just barely noticeable, but fast enough to give sufficient variation of stimulus to perhaps effect browsing. However, as will be appreciated by persons of ordinary skill in the art, this is a subjective judgment that will not necessarily apply in all lighting situations or for all observers. Embodiments described herein provide teachings for persons skilled in the art to apply the principles described in a variety of settings. FIG. 1C is a graphic representation of the time cycle between color transitions, wherein "t" indicates transition time between individual RGB colors and thus $3t$ represents a full cycle period. For example, for a 12 second cycle period, each individual color transition time would be 4 seconds.

The manipulable visual parameters in various embodiments described, such as color and brightness variations, which manifest on a spatial scale dictated by the colored patterns within the target region, and frequency of such variations, may be considered together as a whole to provide an overall "magnitude of effect." The magnitude of effect with embodiments disclosed herein is thus adjustable across a full range of human detection, from overtly obvious to subconscious redirecting of visual focus (defined herein as not consciously aware of, but could become aware of if paying close attention), to subliminal redirecting of visual focus (defined herein as subtle such that the mind is influenced, but at a level that the observer could not be aware of even if attempting to be aware of it). For example, in a retail store setting, the magnitude of effect may be adjusted to suit different types of product displays, ranging from overtly obvious (e.g. the toy aisle) to subconscious scanning facilitation (e.g. the medicines aisle).

As will be appreciated by persons of skill in the art, installation configurations to effect methodologies disclosed herein may take a variety of forms. For example, a relatively non-complex RGB-only product that works with existing ambient white lighting of any type (fluorescent, HID, halogen or even daylighting) may be employed. However, one consequence is that the overall illumination color point is skewed to "off-white" CIE xy values. While one of the strategies discussed herein is to direct the RGB transition effect onto the product display by use of narrow beam spot lights and thus minimize any perception of the subtle "off-white" color changing, some design sensitivities may prefer more strict adherence to conventional white light norms. For more sensitive lighting environments, a tunable light source with multiple LED wavelengths for each color may be provided, such that a constant color point is always maintained. For example, a six-channel light source (containing two different wavelength red LEDs, two different wavelength green LEDs, and two different wavelength blue LEDs) might be used to dynamically shift color rendering properties while maintaining the right balance of color components. In this case, the illuminant color point holds a constant CIE xy value with the result that there is no perceptible change in color as a function of time when directly viewing the lamp and the illumination of white colored objects. As further alternatives, solutions with only white LEDs may also be possible, such as using multiple channels white LEDs, each with the same CCT, but with different spectral power distribution. In yet another installation alternative, multiple channels with white LEDs of different CCTs may be employed so that dynamic spectral cycling is at least always Planckian.

Figure 2:
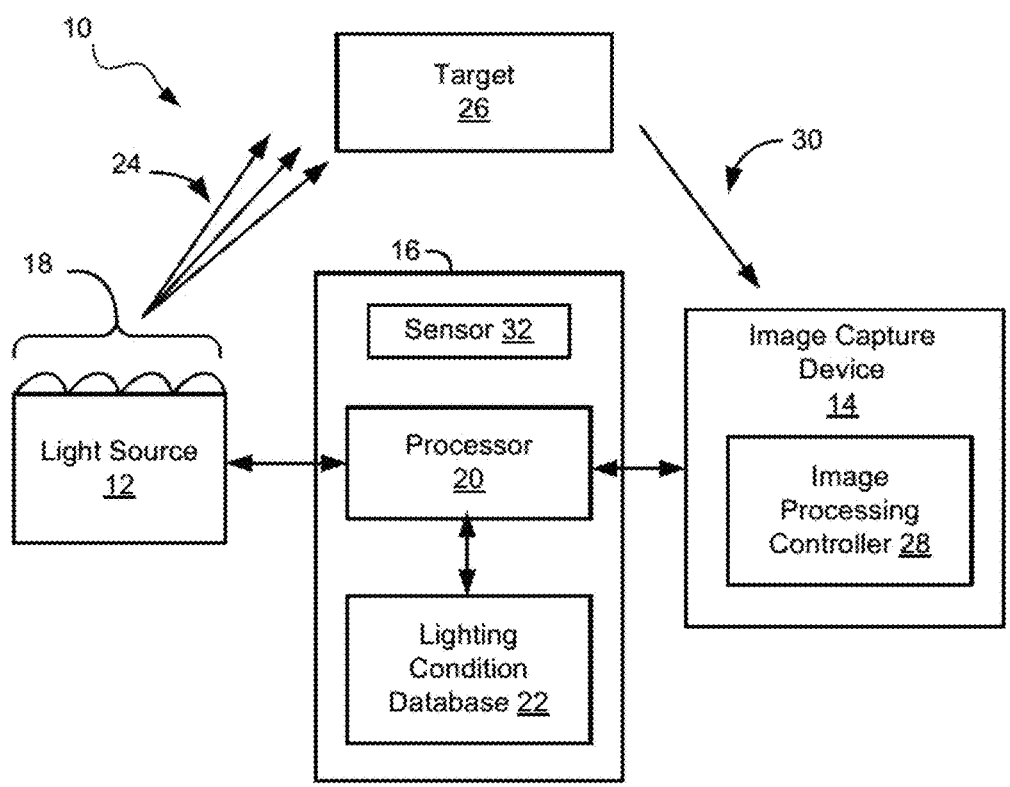
FIG. 2 is a block diagram illustrating a system embodiment.

An example of a color tunable installation configuration is system 10, shown in FIG. 2, a computer-based system that may be used to implement desired color transitions as elsewhere described herein. As shown in FIG. 2, system 10 includes light source 12, which may be a multicolor light source including a color-mixing multiple LED arrangement 18. As generally understood, LED arrangement 18 may include a plurality of different color LED chips for emitting light of different respective colors, which are mixed to produce a color-mixed light output (e.g., white light). Such a system may be used, for example, to shift the illuminant color point as discussed further below. In this example, light controller 16 includes processor 20 configured to control each colored LED of LED arrangement 18. In particular, the composite output spectrum of the light source 12 can be adjusted by the controller based on preprogrammed lighting conditions from a lighting condition database 22 stored in memory so as to create light of varying characteristics. For example, LED arrangement 18 may include red-, green-, blue-, and yellow-emitting LEDs, as well as other color LEDs, including white, in which each colored LED is individually controlled by the controller 16 and mixed so as to produce an output lighting condition, including color cycling. Light output 24 from the LED arrangement 18 illuminates target 26, which as elsewhere described, may include, for example, a retail display including packaging/merchandise in many different colors.

System 10 also may include optional image capture device 14, such as a charge-coupled device (CCD), configured and positioned to capture one or more images representative of the target 26. Image capture device 14 and light source 12 may be synchronously coupled with one another, such that the image capture device 14 is configured to capture one or more images of target 26 continuously or at predetermined points in the color cycle. Image capture device 14 may comprise any suitable device for capturing electronic/digital images with sufficient resolution to facilitate the processing described herein. Image capture device 14 communicates with light source 12 and light controller 16 via wired or wireless communication. Image capture device 14 may also include image processing controller 28 configured to process the image to detect and identify attributes of one or more aspects of target 26 as depicted in a captured image. In particular, the image processing controller 28 may be used to determine colors present in the target region and to alter the lamp spectral color scheme or magnitude of effect based on information stored in lighting condition database 22 and predetermined algorithms stored in memory. For example, a specific RGB accent lighting cycle to optimally expand the spatial viewing range of browsing shoppers may include customizing the order of R, G, and B pulses to logically connect percolation pathways across the color patches of a product display, or overlapping R+G pulses if yellow objects are detected, and/or overlapping R+B pulses if purple objects are detected.

System 10 also may optionally include vacancy/occupancy sensor 32, which may be part of controller 16 or separately provided and communicating with the controller 16. Available sensors based on ultrasonic or passive infrared technologies, among others, may be employed. Alternatively, image capture device 14 may be configured as an occupancy sensor. Alternatively, a radio-frequency (or other) transmission from the customer's mobile or wearable device, either directly communicated or via an IoT protocol, might announce the presence of an individual. One use of sensor 32 is to automatically adjust the magnitude of effect (defined above) of the system based on occupancy or vacancy of the space containing the target region. For example, in a retail store setting, when no occupancy is detected nearby, a large magnitude of effect might be invoked to attract distant shoppers elsewhere in the store beyond the immediate target region. The magnitude of effect may then be reduced when shoppers occupy the space adjacent the target region. Additionally, further discrimination may be made based on proximity to a display/shelf itself. For example, when shoppers are between one and three meters away, a more subtle magnitude of effect may be invoked to facilitate optimized browsing. When a shopper is less than a meter away from a display, it may be assumed in a specific store setting that the shopper is focusing concentration on a specific item. In this case the system may cease all lighting variation to deliver constant high quality illumination. When the shopper steps back again, it may be assumed, again based on specific store settings, the shopper is back in browsing mode and the system can as well revert to a subtle magnitude of effect. Further details of suitable hardware systems for implementing embodiments described herein may be found in U.S. Patent Application Pub. No. US 2014/0265882 A1, entitled "System and Method For Controlling Lighting," which is incorporated by reference herein in its entirety.

As mentioned above, various techniques may be derived from the teachings herein to create spectral conditions capable of dynamic changes in color rendering. One example, as described above in connection with FIG. 1A, involves spectral construction using a RGBW (red, green, blue, white) set of LEDs, for example as LED arrangement 18. With this technique, cycling through red-green-blue spectra provides a continuous, slightly "off white" illumination, but only slightly so, as illustrated in FIG. 1A. It is to be noted that RGB intensities as depicted in FIG. 1B, and similarly in the lower regions of FIGS. 9-13, are normalized in color figures presented herein, but in practice are each adjusted to achieve the desired visual effect, which when superimposed on the ambient white illumination results approximately as depicted in FIG. 1A.

Figure 3:
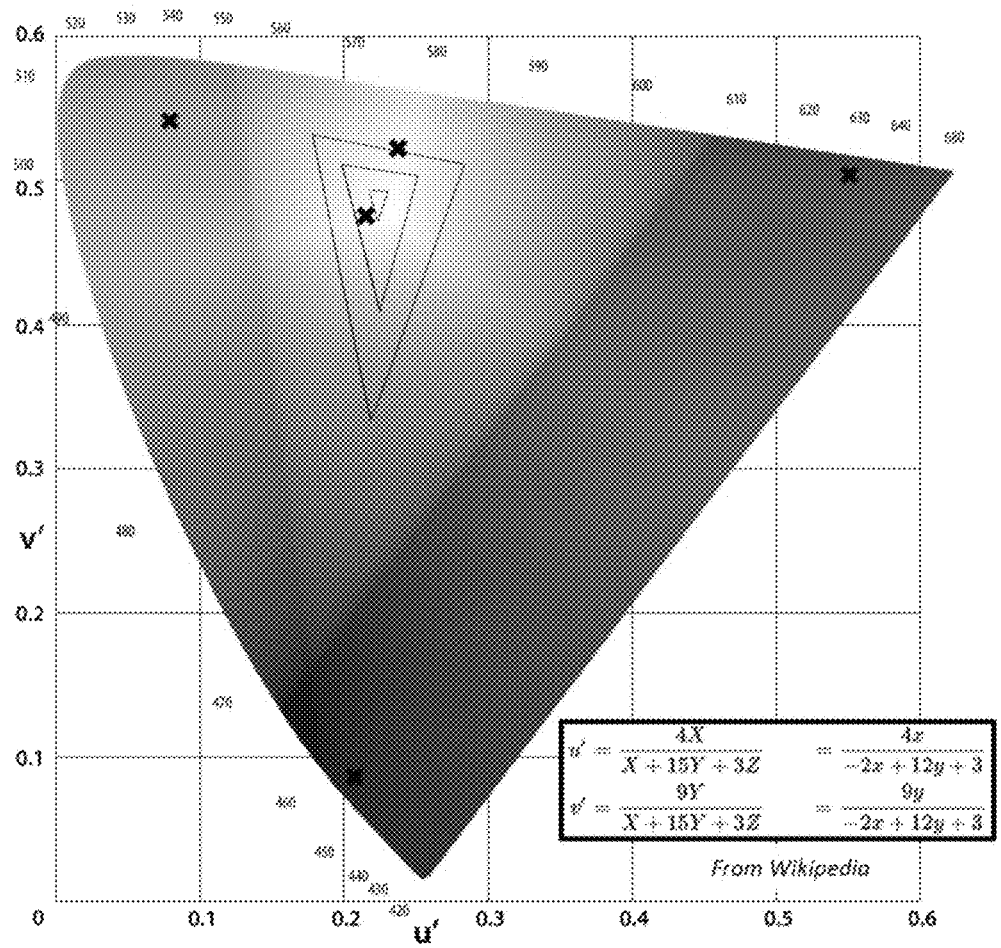
FIGS. 3 and 4 are CIE (1976) (L*, u*, v*) chromaticity diagrams showing color transition trajectories according to alternative embodiments of the present disclosure.

Further alternative embodiments are described with reference to FIGS. 3 and 4, which illustrate trajectories through the color space on the (u', v') chromaticity coordinate system in CIELUV 1976 (L*, u*, v*) color space, in which distance is linear with color perception. As shown in FIG. 3, each "x" marks the approximate color point of LEDs (R, G, B, W-6500 K, W-3000 K) used to color render the trajectories. The triangles within the color space depict three illustrative, dynamic color transition trajectories that can be produced by dynamic color-mixing of these LEDs. These three illustrative trajectories are trajectories used in examples later described herein.

Figure 4:
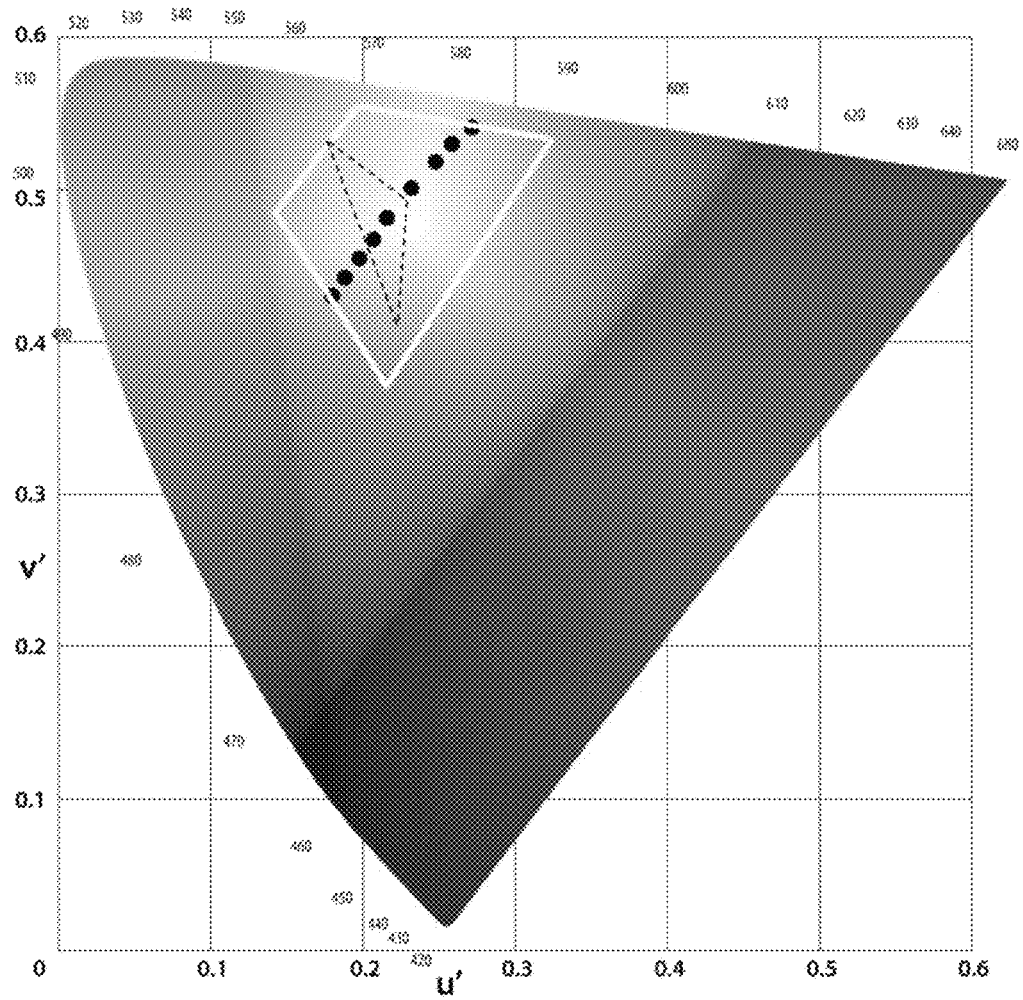

FIG. 4 presents another color rendering trajectory as a dashed triangular polygon. Also overlaid in FIG. 4 are black circles representing a series of Planckian blackbody points ranging from about 2500 K to about 12000 K. The indicated blackbody points mark typical expectations of "white" illumination. The white, quasi-trapezoidal boundary shown within the color space of FIG. 4 represents one example range of color space within which dynamic color transitions in accordance with embodiments of the present application should remain so as to both effect color rendering variations and be close enough to "white" so as to be "just barely noticeable" to the observer. The quasi-trapezoidal boundary may be defined by four (u',v') points, in this example: (0.320, 0.530), (0.200, 0.560), (0.140, 0.490), and (0.220, 0.370).

As will be appreciated by those of skill in the art upon observation of FIG. 4, two opposing edges of the quasi-trapezoidal boundary are essentially parallel with the blackbody locus (the black circles representing select points between about 2500 K and about 12000 K) and thus a constant distance in u'v' color space from acceptable white color points. The other two opposing edges of the quasi-trapezoidal boundary are essentially parallel to the monochromatic perimeter of the u'v' color map and passing through the blackbody locus at about 2500 K and about 12000 K, respectively.

Again, with respect to the example as depicted in FIG. 4, a rate of change of illumination color points around the color rendered trajectory may be calculated as a standard Euclidean distance in u'v' space and expressed in units of $\Delta u'v'$ distance per second. In this embodiment, it is preferable that the rate of change of illumination color points is faster than about 0.005 per second (in order to stay above a not noticeable threshold), and slower than about 0.070 per second (in order to avoid being too noticeable, potentially to the point of annoyance and distraction for some observers). The dashed triangular polygon represents a set of illumination color point transitions corresponding to one embodiment. However, color point transitions (trajectories) as disclosed herein do not need to follow any specific geometric pattern, and in fact, single line transitions between two color points, for example as along the blackbody locus between "warm-white" and "cool-white" also may be employed.

In another embodiment, spectral construction to provide desired color-cycling employs two different wavelengths of LEDs for each color. For example, by way of illustration only, such an embodiment may employ two different blue LEDs (e.g. 450 nm and 470 nm, hereinafter "B1" and "B2", respectively), two different green LEDs (e.g. 510 nm and 530 nm, hereinafter "G1" and "G2", respectively), two different yellow LEDs (e.g. 570 nm and 590 nm, hereinafter "Y1" and "Y2", respectively) and two different red LEDs (e.g. 620 nm and 640 nm, hereinafter "R1" and "R2", respectively). White LEDs may also be designed into such a spectrum, but for illustrative purposes this embodiment is explained by reference to an RGBY system of monochromatic LEDs. Because the materials that compose any target (such as packaging graphic) will have particular spectral reflectivity characteristics, it can be presumed that white light illumination composed of any one set of blue, green, yellow and red wavelength LEDs (e.g. B1, G1, Y1, R1) will render colors slightly different from the white light illumination comprised of other sets of blue, green, yellow and red wavelength LEDs (e.g. B2, G2, Y2, R2). When at least two, but preferably three, four or more such RGBY combinations are found to generally render colors sufficiently different from each other with respect to a selected array of objects within a target space, these various RGBY combinations can be each individually balanced to create the same white CIE xy color point, and then cycled such that each spectrum takes a turn at illuminating the objects. When just-noticeable color rendering is a goal, care should be taken to maintain a constant overall luminous intensity.

Figure 5:
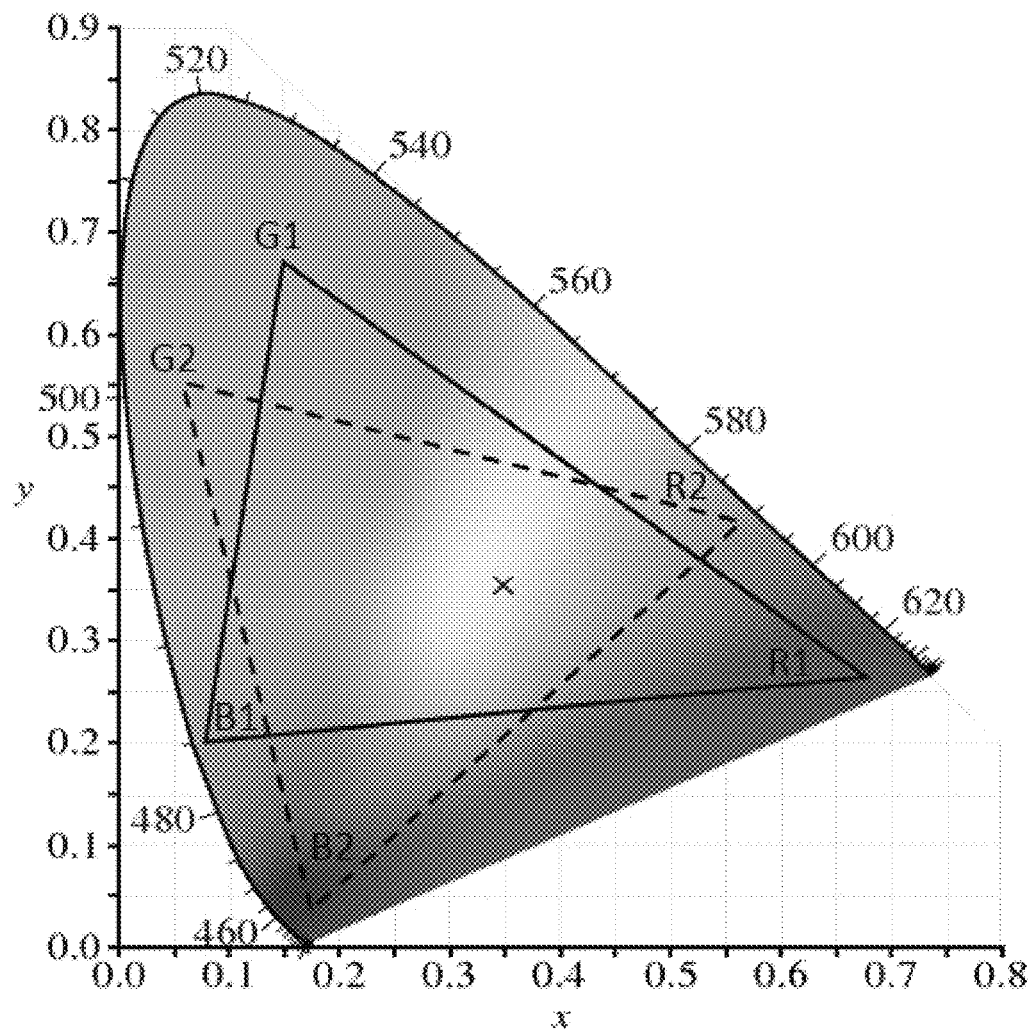
FIGS. 5 and 6 are CIE(1931) xy chromaticity diagrams illustrating possible alternative formulations for color transition trajectories according to embodiments of the present disclosure.
Figure 6:
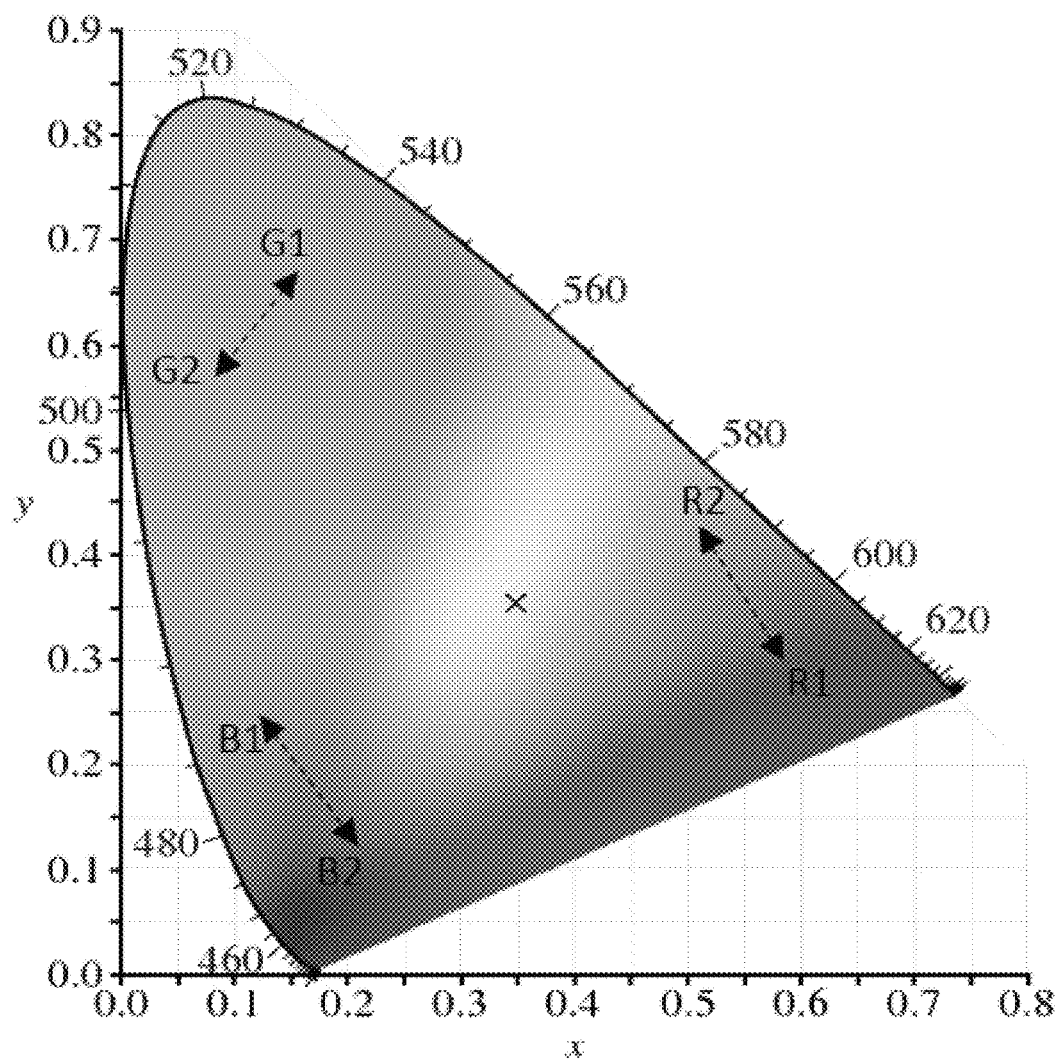

FIGS. 5 and 6 illustrate a further alternative embodiment as discussed in the preceding paragraph, but in a somewhat simplified form using three color pairs (RGB instead of RGBY). In both figures, the "x" indicates the "white" illumination point. FIG. 5 shows two hypothetical color transition trajectories possible by employing multiple illuminant points for each primary color point in the trajectory, in other words, R1,R2 for red, G1,G2 for green, and B1,B2 for blue. As indicated in FIG. 6, color point may be shifted linearly and with essentially infinite variation (subject to hardware limitations of the rendering system) between each illuminant point pair. Specific ranges may be defined for particular applications in terms of minimum $\Delta u'v'$ color distance between color point pairs (e.g., G1, G2) and rates of change for making transitions between intensity levels of color point pairs, in units of $\Delta u'v'$ distance per second. For example, a viable system based on that shown in FIG. 6 might include selection of LEDs with the following dominant wavelengths: for red LEDs R1 and R2 of 640 nm and 600 nm; for green LEDs G1 and G2 of 545 nm and 510 nm; for blue LEDs B1 and B2 of 480 nm and 450 nm. To further this example, if the transition rate between color point pairs is chosen to be 6 seconds, values of $\Delta u'v'$ distance per second would be approximately 0.020, 0.030 and 0.020 for the color point pairs red, green and blue, respectively.

In embodiments described above, lighting methods and systems are disclosed in which color spectra transition through a defined illumination sequence such that color rendering of illuminated objects in a target region is deliberately varied to facilitate eye movement across the target region and, at least in some cases, promote subtle arousal of the visual senses. One objective of the above described embodiments, in the context of a retail store setting, is to leverage existing, generally random, colorful patterns present in packaging design graphics and thereby promote a randomized time-dependent color accent within the target region, which in retail context can usually be expected to be a shelf display of various products, e.g. in a supermarket or drugstore. As such, the above-described embodiments do not necessarily require or depend upon any particular packaging graphics design patterns or colors.

In contrast to the above-described embodiments, which need not involve coordination of packaging design with lighting effects, in further alternative embodiments described below, the deliberate coordination of package design color patterns with lighting effects may be used to create the appearance of animation-like visual experiences ("quasi-animation") in localized patterns. For example, by juxtaposing select colors used in the packaging design, a pulsing effect may be created in response to RGB transition cycling as described above. Such juxtaposed colors may involve packaging graphics such as red/green colored labels designed to pulse red, then green or red/green/blue colored labels designed to pulse red, then green, then blue in response to cycled illumination effects. These packaging features, for example, may be incorporated into text labelling, logos or picture animations.

In quasi-animation embodiments, modest packaging design features may be incorporated into standard packaging presentations to leverage the particular color cycle used to execute intentional appearance of temporal/color changes within a single pattern feature for dramatic effect. In one example, an embodiment may comprise a lighting system for general illumination that incorporates just-noticeable or unnoticeable lighting effects that become more noticeable when specific packaging designs are presented under the lighting conditions provided by the system. This would allow retailers or package designers to make decisions on packaging graphics and presentation that quasi-animate as desired with an otherwise standardized illumination scheme. Additional details of embodiments employing quasi-animation schemes are presented below in Examples 8-10.

EXAMPLES

The following examples further describe aspects, features, benefits and advantages of the disclosed embodiments. These examples are provided to further illustrate and explain embodiments described above, and, as will be appreciated by persons of skill in the art, are not intended as exclusive examples or as otherwise limiting of the scope of the disclosure. In each of the following illustrative examples, substantially the same illumination conditions and eye tracking methodology is utilized. These are first described below, followed by the specific illustrative examples.

Illumination Conditions

Except as otherwise pointed out below, the experimental RGB lighting conditions used were a combination of "static" 3000 K ambient white lighting (from recessed ceiling LED downlights, 82 CRI) and dynamically controlled RGBW track lighting which is aimed principally at the display shelves. Vertical illuminance at mid-height of the shelf display was measured at 1450 lux, of which approximately 900 lux are being provided by the RGBW fixture. The RGBW fixture was a Miro Cube™ 4C fixture from Rosco Laboratories, Inc., which uses OSRAM O-star RGBW LED packages and lenses that concentrate the O-star light output into a directional illumination.

The dynamic RGBW component of the illumination is controlled by a DMX controller to alternately cycle the colors to produce "red, followed by green, followed by blue" sequences with some overlap of colors as is illustrated schematically in FIG. 1B. Intensity levels of each of the R, G and B LED colors were adjusted to suit the subjects' visual estimation of appropriateness for our "just barely noticeable" criterion, and the resultant illumination generated by those chosen adjustments are described by FIG. 1A. The white LED of the RGBW fixture was also controlled dynamically to maintain a constant lumen output. Three transient conditions corresponding to peak R, peak G and peak B were rigorously characterized, whereas intermediate conditions, points at which two LED colors blend, were not characterized explicitly, and can be estimated by the overlap implied by the information in FIG. 1B.

The composite illumination was measured for the conditions of peak red contribution, peak green contribution and peak blue contribution. A composite vertical illuminance of approximately 1450 lux was recorded with CIE x,y color coordinates for the peak red, peak green and peak blue conditions were (0.380, 0.369), (0.341, 0.482) and (0.295, 0.236), respectively. While the detailed results of experiments and testing are not described herein, it should be known that evaluations of prototype systems did rely on comparison to a control condition which was created to provide a constant white illumination, for which the R, G and B channels of the RGB fixture was held at fixed levels (in addition to the same ambient white light illumination). The combined "static" RGB+ambient white illumination used for the control condition was about 4600 K.

As mentioned, FIG. 1A shows the approximate CIE color coordinates used, which was cycled with a 12 second period as represented in FIG. 1B. This cycle speed was judged, for purposes of these examples and to illustrate principles of the embodiments disclosed, to be slow enough to be just barely noticeable, but fast enough to give sufficient variation of stimulus to perhaps effect browsing. Other cycle periods may be employed to achieve different effects as described above. It is also to be noted that determination of a cycle frequency as judged to be "just barely noticeable" is dependent on the intensities of the RGB fixture. It was generally noted that larger changes in color-accented illumination intensities tended to use longer cycle times to achieve a "just barely noticeable" assessment. Correspondingly, smaller changes in color accented illumination can be cycled faster before being deemed "noticeable".

The lighting conditions described above refer to a room in which the target region was configured as a simulated retail display and eye tracking as described below was conducted. In these examples, the entire room is uniformly illuminated with ambient white lighting, and the display shelf is uniformly supplemented with the dynamic RGBW lighting condition. The simulated retail display was constructed as shown in following figures, using a collection of grocery products purchased from a local supermarket. A factor to note is that the objects illuminated in these examples are products with inherently colorful packaging labels, whereby no instinctual sense of "natural color" exists.

It is also important to note that the lighting conditions under which the tests described in these examples were performed is not presented as or considered to be an optimized lighting condition, but rather a suitable set of conditions to illustrate principles, advantages and effects of the disclosed methods and systems.

Eye Tracking

In order to obtain information about the effect of disclosed methods on observer visual response, eye-tracking was used. Eye tracking was performed using the Tobii Pro Glasses 2 product from Tobii Technology, Inc. in Falls Church, Va. (see, https://www.tobiipro.com/product-listing/tobii-pro-glasses-2/). The tracking equipment was used (including data acquisition and data analysis) in accordance with methods defined by the manufacturer, without any improvised procedures and following all manufacturer calibration methods. As a general description, the eye tracking glasses employ infrared (IR) LEDs incorporated into a special pair of glasses which illuminate the subject's eyes (left and right separately) with IR radiation such that calibrated reflections from the subject pupils are measured with IR detectors (also incorporated into the special glasses), and "gaze direction" is deduced. In a calibrated way, these measured gaze directions are correlated with a camera (also incorporated into the glasses) which is directed in the same general direction as the subject's field of view. Software analysis allows measurement of gaze direction as a function of time, saccade velocity (angular degrees per second) and fixation locations (as defined by some threshold time that gaze is confined to a particular location). This data is plotted on video frames of the camera image acquisition.

Example 1

Figure 7:
FIG. 7 presents color photographs illustrating color rendering effects according to an embodiment as described in Example 1.

This example demonstrates RGBW illumination of a mock supermarket display of packaged food items in which large amounts of ambient—3000 K—white light bathes the room, maintained at a constant power level. Superimposed on the white light was output from a separate RGB fixture which was cycled as described above and in FIGS. 1A and 1B. Snapshots of peak red output, peak green output, and peak blue output are shown in FIG. 7 from left to right. (Not illustrated are transitions between peak states, i.e., mixtures of RG, GB, and BR).

The changes in color rendering apparent in FIG. 7 (to the extent such can be accurately captured in a photograph as reproduced here) are quite apparent when the "peak color" snapshots are viewed side-by-side as presented. However, not conveyed in the snapshots of FIG. 7 is the effect of cycle time between "peak color" conditions. When cycled slowly enough, even these different color rendering changes were found to be barely perceptible, and the "peaks" very transient relative to the entire cycle. When cycled progressively faster, these color rendering changes were seen to progress across a spectrum of visual effects, which were subjectively characterized as from tantalizing, to fun, and at some point, to annoying/undesirable.

It should be noted that in this example, most products have several colors included in each individual package design. As such, as the lighting conditions cycle through different illumination spectra, it is common for multi-color package designs to be highlighted in different ways throughout the spectral cycling. As a result, in general, it is not that different products take turns being highlighted, but rather that each individual product appears to morph to a slightly different appearance of its particular multicolor balance.

Example 2

Figure 8A:
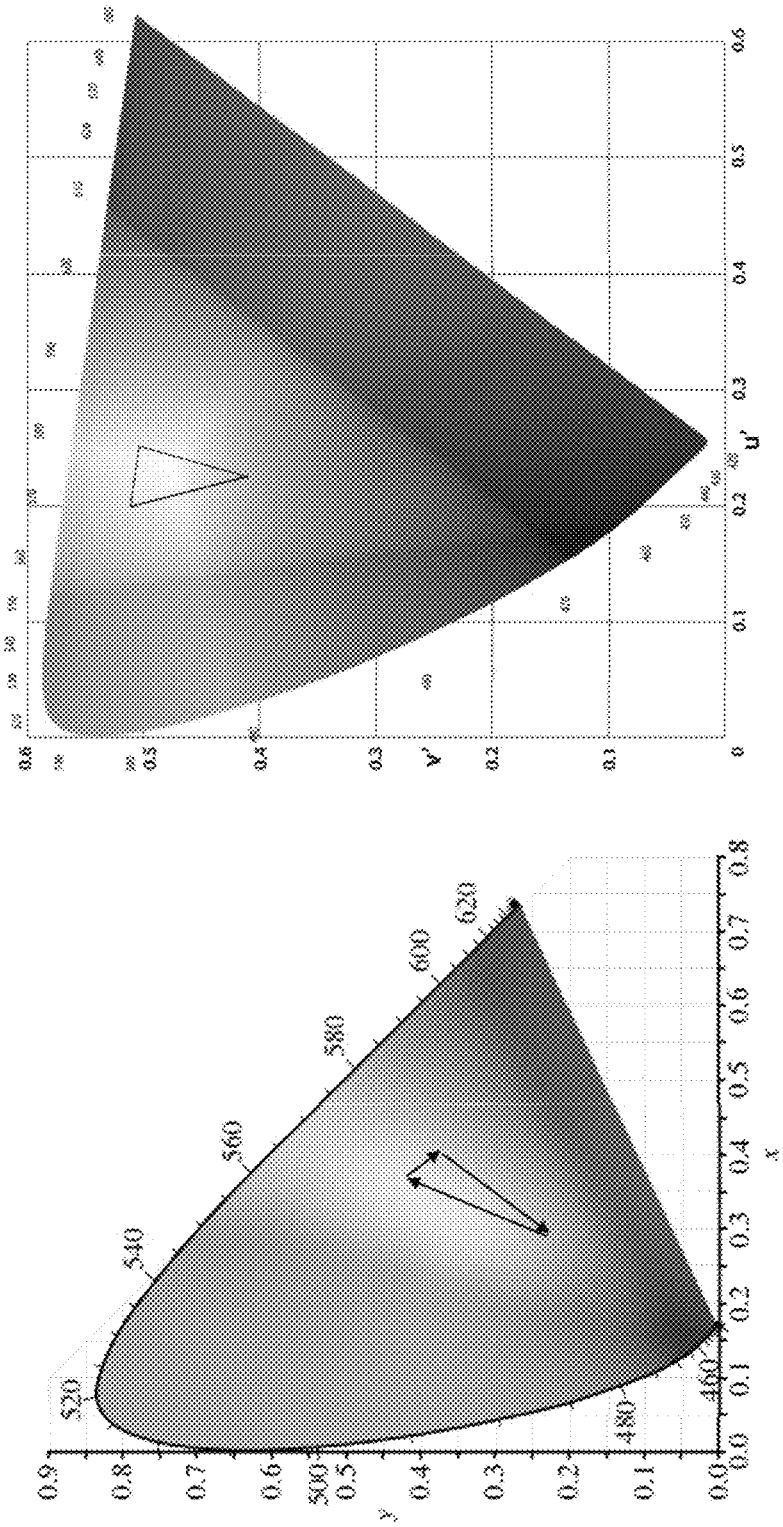
FIGS. 8A and 8B present CIE xy and CIE (L*, u*, v*) chromaticity diagrams illustrating alternative transition trajectories and intensities according to embodiments as described in Example 2.
Figure 8B:
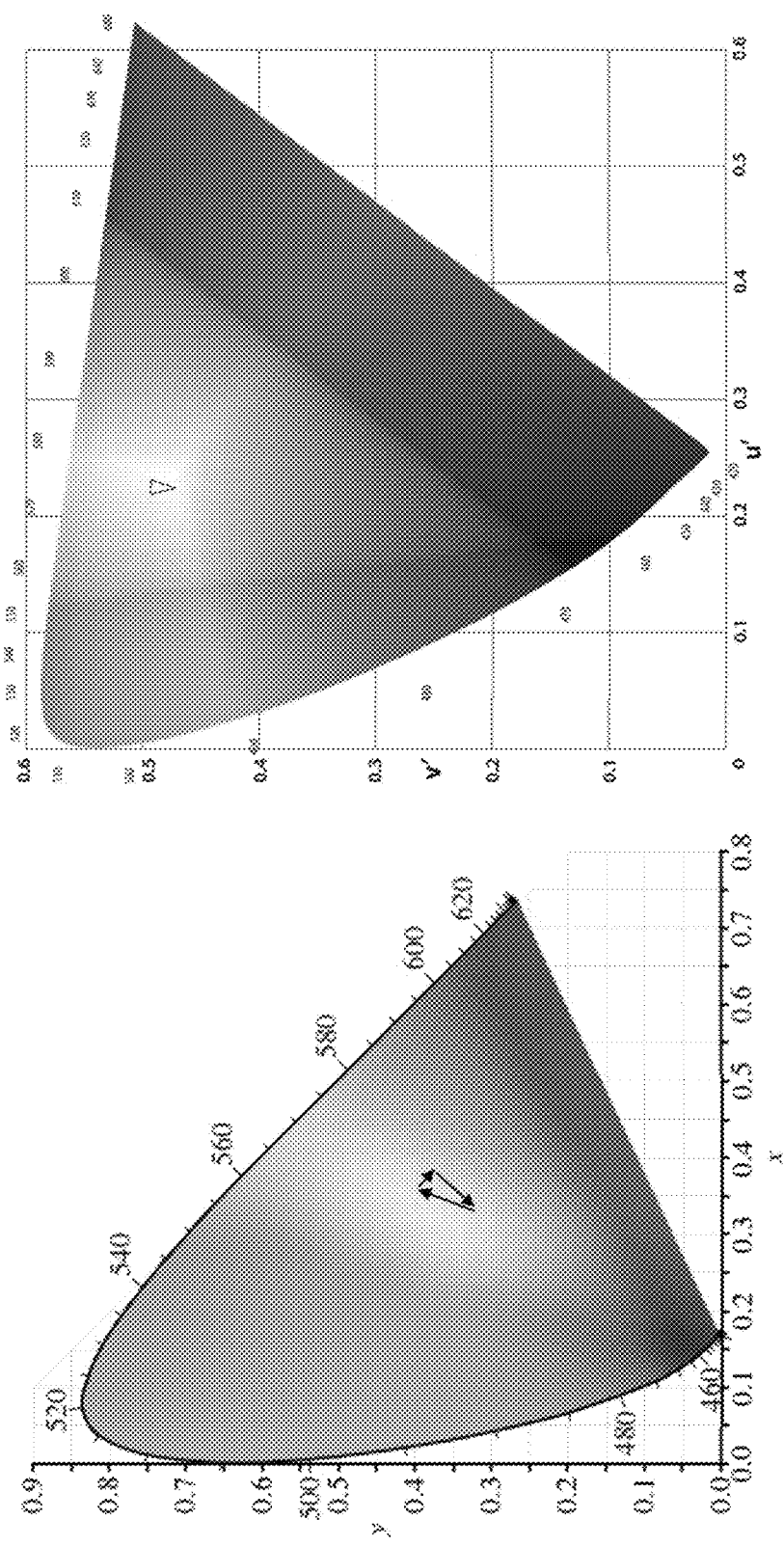

This example presents two experiments with different RGB light intensity levels, showing color transition trajectories plotted in color space: FIG. 8A shows a medium saturation trajectory and FIG. 8B shows a low saturation trajectory. Resultant (white+RGB) CIE (x,y) color coordinates for each condition are shown. As objectively as possible, it has been determined that the two extreme cycle frequencies correspond to "barely noticeable" and "borderline disturbing". The cut off for "borderline disturbing" was found to be with transition times of 0.5 seconds and 1 second for the low saturation and medium saturation conditions, respectively. The criteria for "barely noticeable" was found to be with transition times of 4 seconds and 8 second for the low saturation and medium saturation conditions, respectively. The total cycle time (i.e. the period) of an entire RGB cycle is 3 times the transition time.

Examples 3-7

Results presented in Examples 3-7 are extracted from a two minute experience of wearing the eye tracking glasses as described above. For simplicity of illustration, all results in this report will refer to a single 12 second time period that encompasses one full RGB cycle. All "gaze direction" raw data is recorded by the system, and various methods of analyzing the data are possible. Results presented here are based on standard analysis routines available in the manufacture's software for the tracking glasses and show data from an individual observer. In these examples, FIGS. 10, 11, and 12, each present portions of the same data presented in FIG. 9, but break out the results for each illumination accent color separately.

As a matter of standard eye tracking terminology, two parameters used are "fixations" and "saccades". If the velocity of the eye movement, as measured in terms of angular degrees per second, is below a certain threshold (the default value for equipment used in these examples was 30°/s), the data points were classified as part of a fixation. If the velocity is above the threshold, the event is classified as a saccade. In each of FIGS. 9-13, each of the numbered circles superimposed on the images represent a fixation, numbered in order of progression in time (i.e. in order of occurrence throughout each 4 second interval). The size of the circle relates to the duration in time of each fixation. Circle size does not infer spatial range of the fixation. The center of each circle represents the calculated average position of all the gaze directions that constitute that fixation. The straight line trajectory between each successive fixation (circle) represents a saccade.

Example 3

Figure 9:
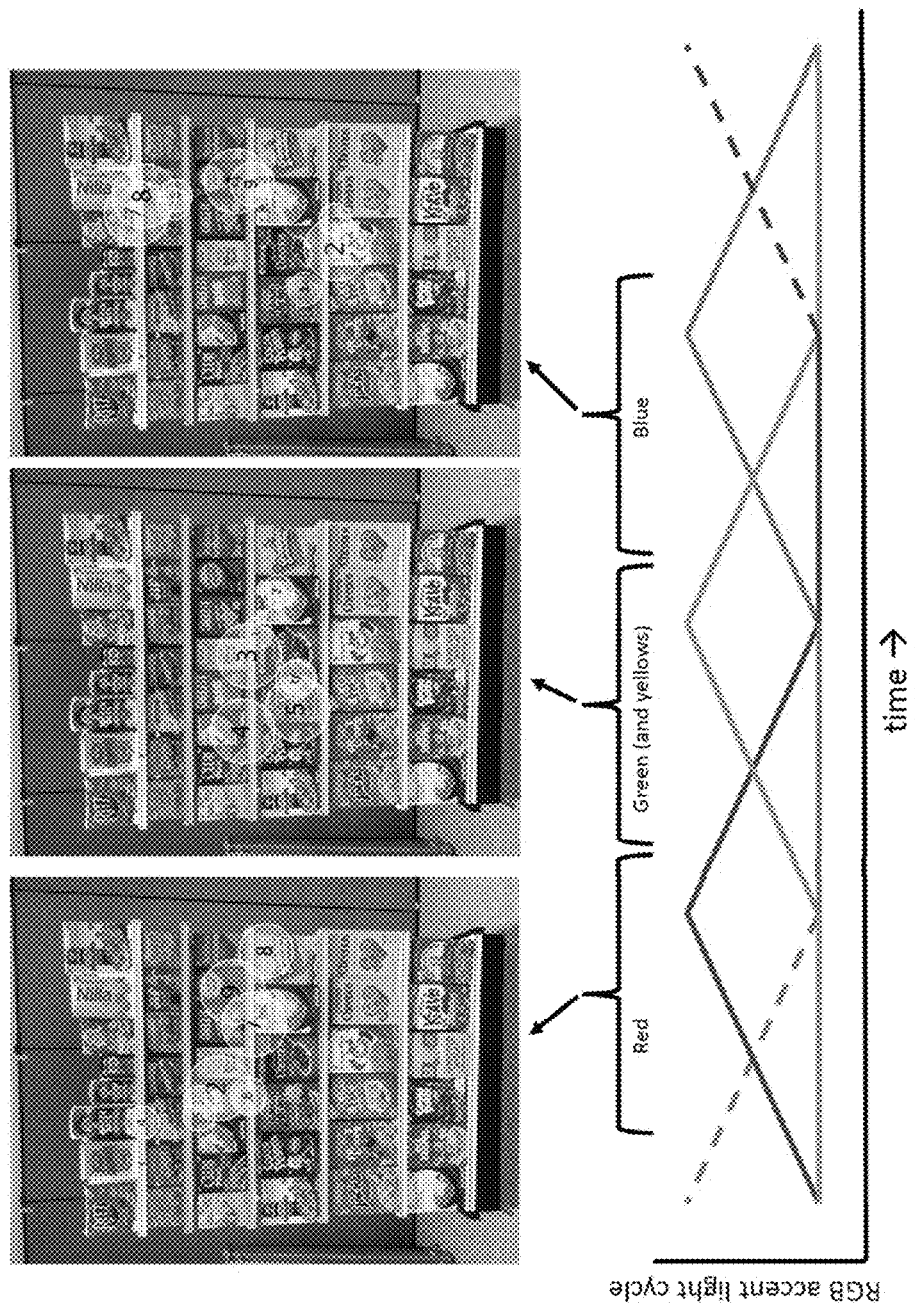
FIG. 9 presents color photographs correlated to a spectral timing plot illustrating color rendering effects according to an embodiment as described in Example 3.

FIG. 9 shows eye tracking results that can be used for correlation of object colors as viewed with the RGB illumination phase as a function of time. Eye tracking results are shown for 12 seconds of consecutive browsing, capturing one complete RGB illumination cycle. The tracking glasses manufacturer-provided analysis software allows analysis of any subset of the acquired data. For simplified viewing, the results in FIG. 9 are summarized into three sequential windows of time each consisting of 4 seconds duration, allowing isolation of each main illumination accent color. The left-most picture shows the objects that were viewed as the red accent illumination rises to prominence, and likewise for the green accent condition and blue accent condition in the center and right pictures, respectively.

Example 4

Figure 10:
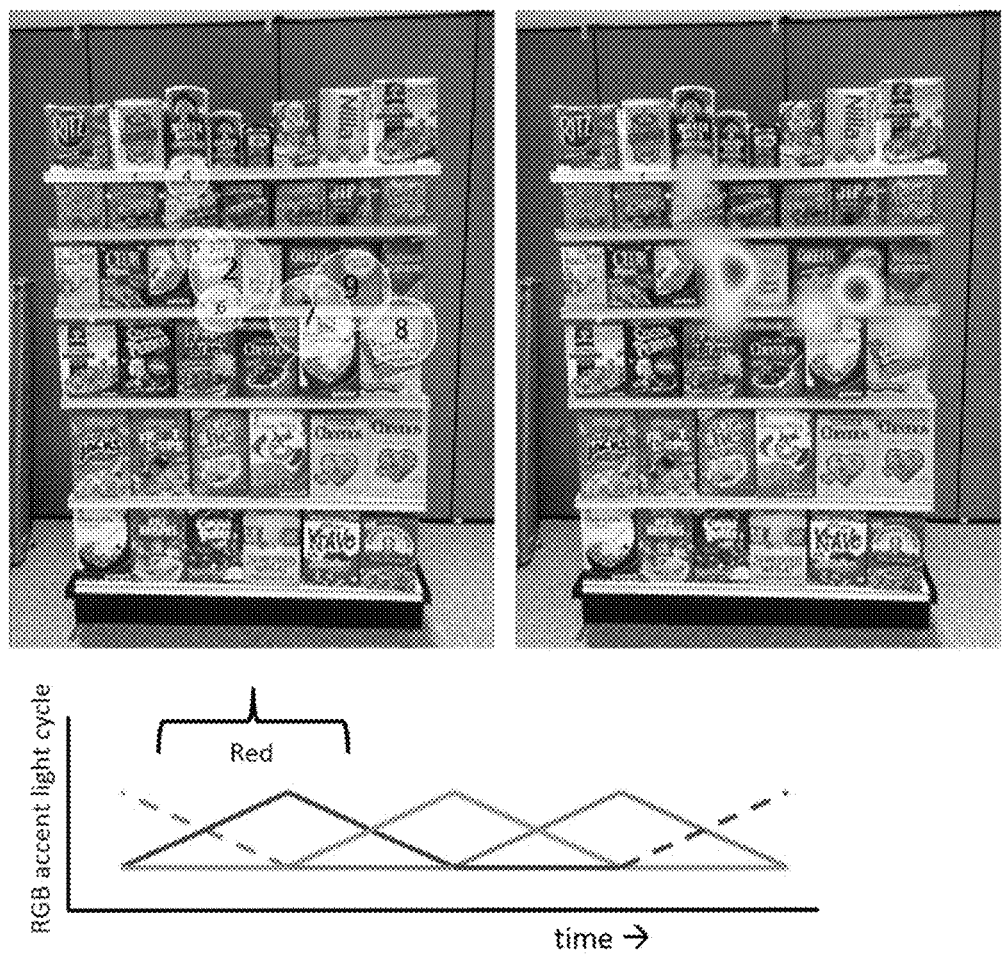
FIG. 10 presents color photographs correlated to a spectral timing plot illustrating color rendering effects according to an embodiment as described in Example 4.

In FIG. 10, the gaze plot (left side image) is associated with the red phase of the RGB illumination cycle, presented in magnified size to allow inspection of which color objects were viewed during this time period. It is seen that most fixations were in the vicinity of red colored package designs. Table I below presents details of each numbered fixation, where the location of each fixation is provided in terms of x,y coordinate relative to the pixel array of the digital photo. A heat map (right side image of FIG. 10) presents the data in Table I in visual form.

TABLE I

| | Red | | |
|---|---|---|---|
| Gaze Order | Start time | Duration | Coordinate (location) |
| 1 | 11:027 seconds | 140 ms | 308, 448 |
| 2 | 11:207 seconds | 720 ms | 329, 390 |
| 3 | 11:967 seconds | 160 ms | 304, 356 |
| 4 | 12:227 seconds | 260 ms | 265, 249 |
| 5 | 12:567 seconds | 140 ms | 279, 355 |
| 6 | 12:727 seconds | 280 ms | 316, 446 |
| 7 | 13:047 seconds | 540 ms | 448, 457 |
| 8 | 13:626 seconds | 420 ms | 586, 479 |
| 9 | 14:086 seconds | 820 ms | 509, 418 |

Example 5

Figure 11:
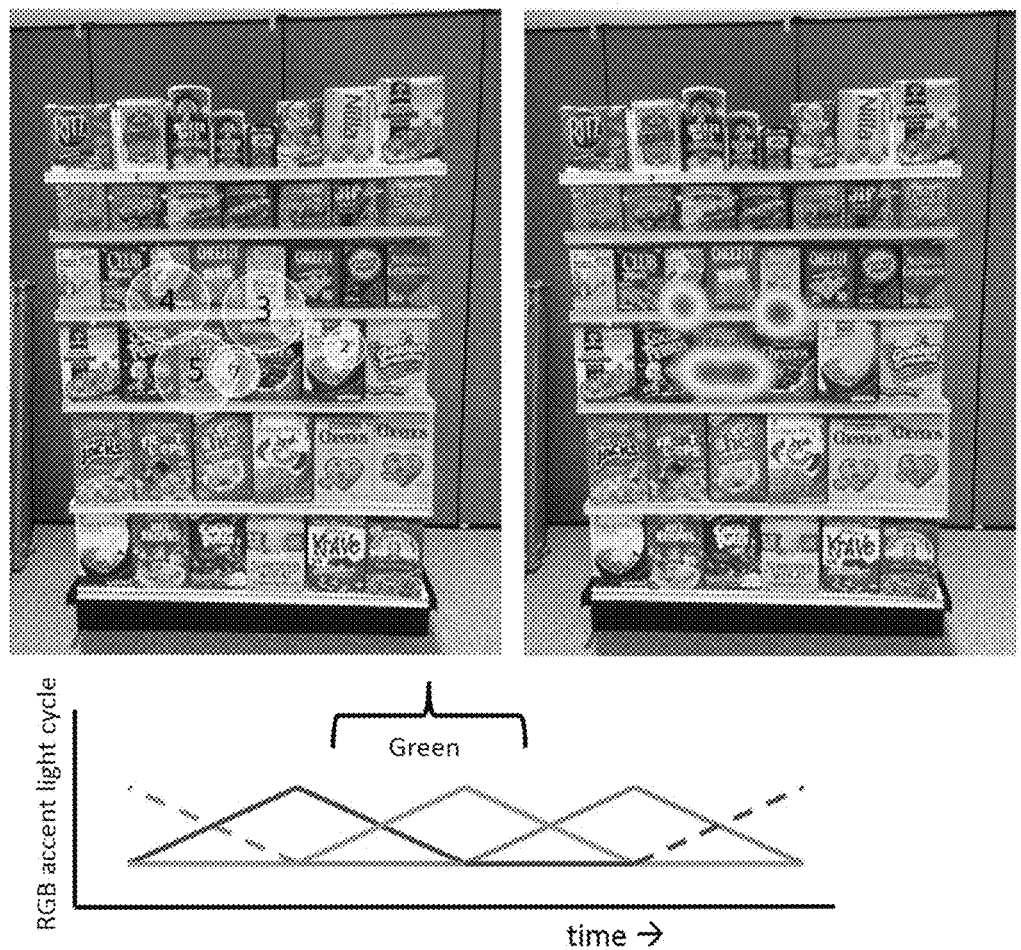
FIG. 11 presents color photographs correlated to a spectral timing plot illustrating color rendering effects according to an embodiment as described in Example 5.

In FIG. 11, the gaze plot (left side image) is associated with the green phase of the RGB illumination cycle, presented in magnified size to allow inspection of which color objects were viewed during this time period. It is notable that no green package designs were viewed in this time interval. It is also notable that early fixations in this time interval (and later fixations represented in FIG. 10) included saturated yellow package designs and 'wheat colored' food pictures, which correlate with the overlap period of red and green accent illumination. Table II below presents details of each numbered fixation. A heat map (right side image of FIG. 11) presents data from Table II in visual form.

TABLE II

| | Green | | |
|---|---|---|---|
| Gaze Order | Start time | Duration | Coordinate (location) |
| 1 | 15:146 seconds | 100 ms | 415, 461 |
| 2 | 15:266 seconds | 200 ms | 494, 500 |
| 3 | 15:526 seconds | 820 ms | 374, 447 |
| 4 | 16:386 seconds | 760 ms | 233, 435 |
| 5 | 17:206 seconds | 980 ms | 275, 536 |
| 6 | 18:325 seconds | 300 ms | 329, 533 |
| 7 | 18:685 seconds | 280 ms | 333, 538 |

Example 6

Figure 12:
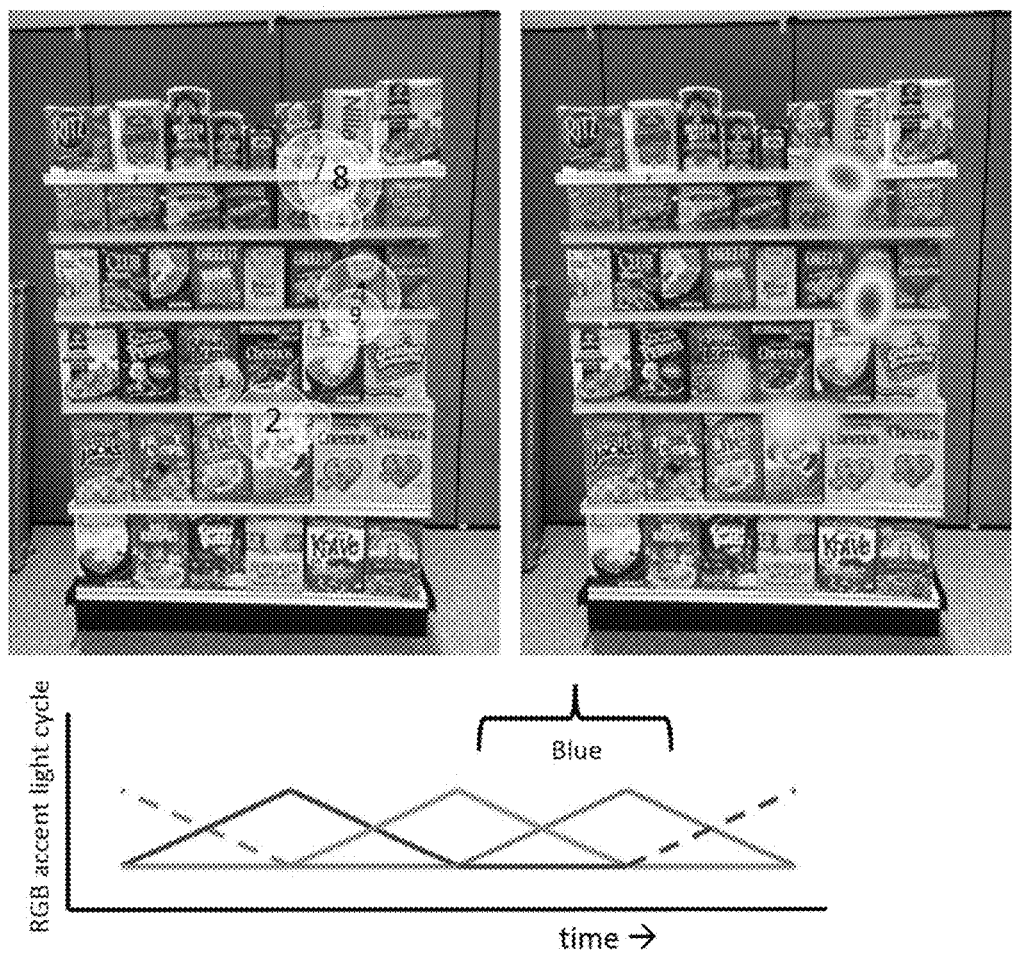
FIG. 12 presents color photographs correlated to a spectral timing plot illustrating color rendering effects according to an embodiment as described in Example 6.

In FIG. 12, the gaze plot (left side image) is associated with the blue phase of the RGB illumination cycle, presented in magnified size to allow inspection of which color objects were viewed during this time period. Here, it can be seen that most fixations were in the vicinity of blue colored package designs. Table III below presents details of each numbered fixation. A heat map (right side image of FIG. 12) presents the data from Table III in visual form.

TABLE III

| | | Blue | |
|---|---|---|---|
| Gaze Order | Start time | Duration | Coordinate (location) |
| 1 | 19:005 seconds | 260 ms | 313, 550 |
| 2 | 19:305 seconds | 500 ms | 390, 610 |
| 3 | 19:845 seconds | 240 ms | 445, 607 |
| 4 | 20:165 seconds | 880 ms | 516, 423 |
| 5 | 21:125 seconds | 100 ms | 474, 306 |
| 6 | 21:245 seconds | 800 ms | 490, 311 |
| 7 | 21:405 seconds | 500 ms | 456, 238 |
| 8 | 21:925 seconds | 540 ms | 489, 252 |
| 9 | 22:544 seconds | 340 ms | 511, 453 |

Example 7

Figure 13:
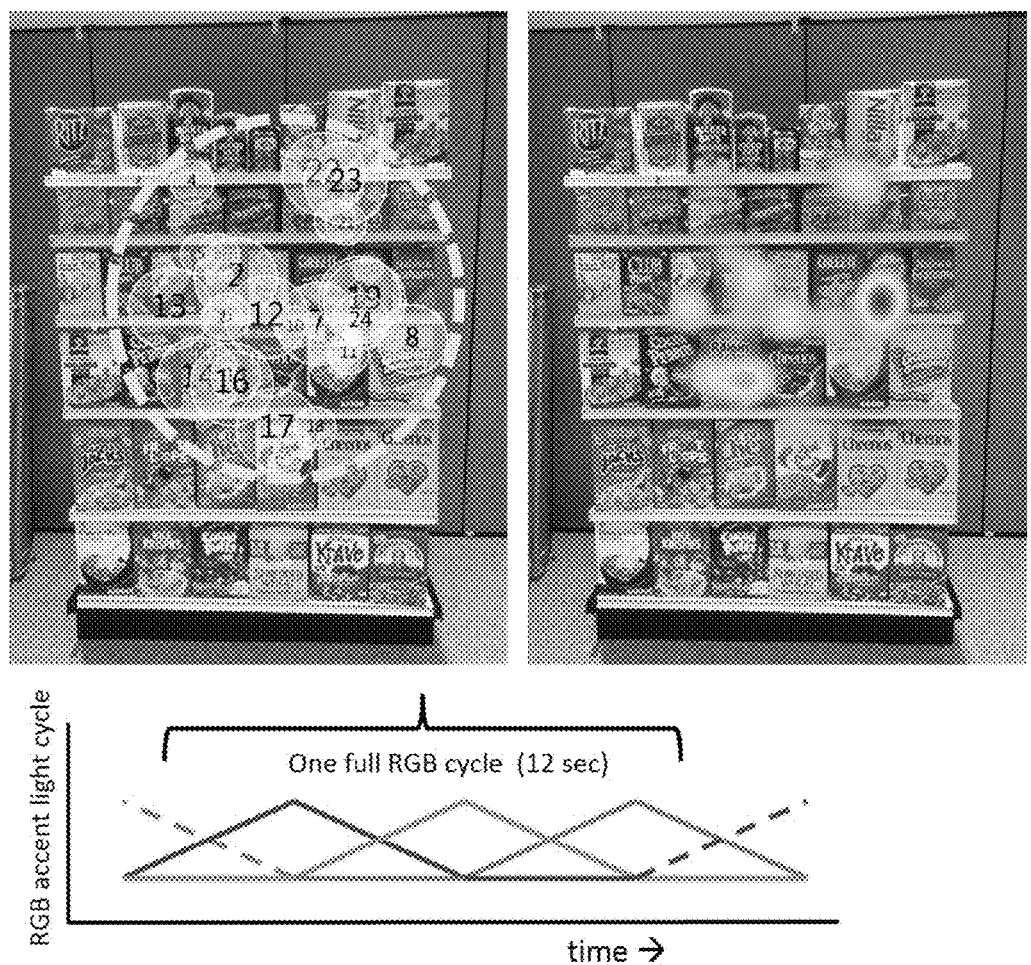
FIG. 13 presents color photographs correlated to a spectral timing plot illustrating color rendering effects according to an embodiment as described in Example 7.

In FIG. 13, the gaze plot (left side image) and heat map (right side image) collect the entire 12 seconds of data discussed in Examples 3-6 onto one set of plots and thus presents a view of overall spatial range of browsing. Note that in the previous examples possible tendencies for an observer to establish fixations on package colors that match the respective RGB accent lighting cycle phases are addressed, but this is only to illustrate general methodologies and is not to be considered as limiting of the claims provided hereinafter. More generally, it is described that dynamic changing of illumination spectra will on average pull the observer's eye to new areas of interest and result in a wider spatial range of browsing when compared with "static" (i.e. constant in time) white lighting.

Example 8

Figure 14A:
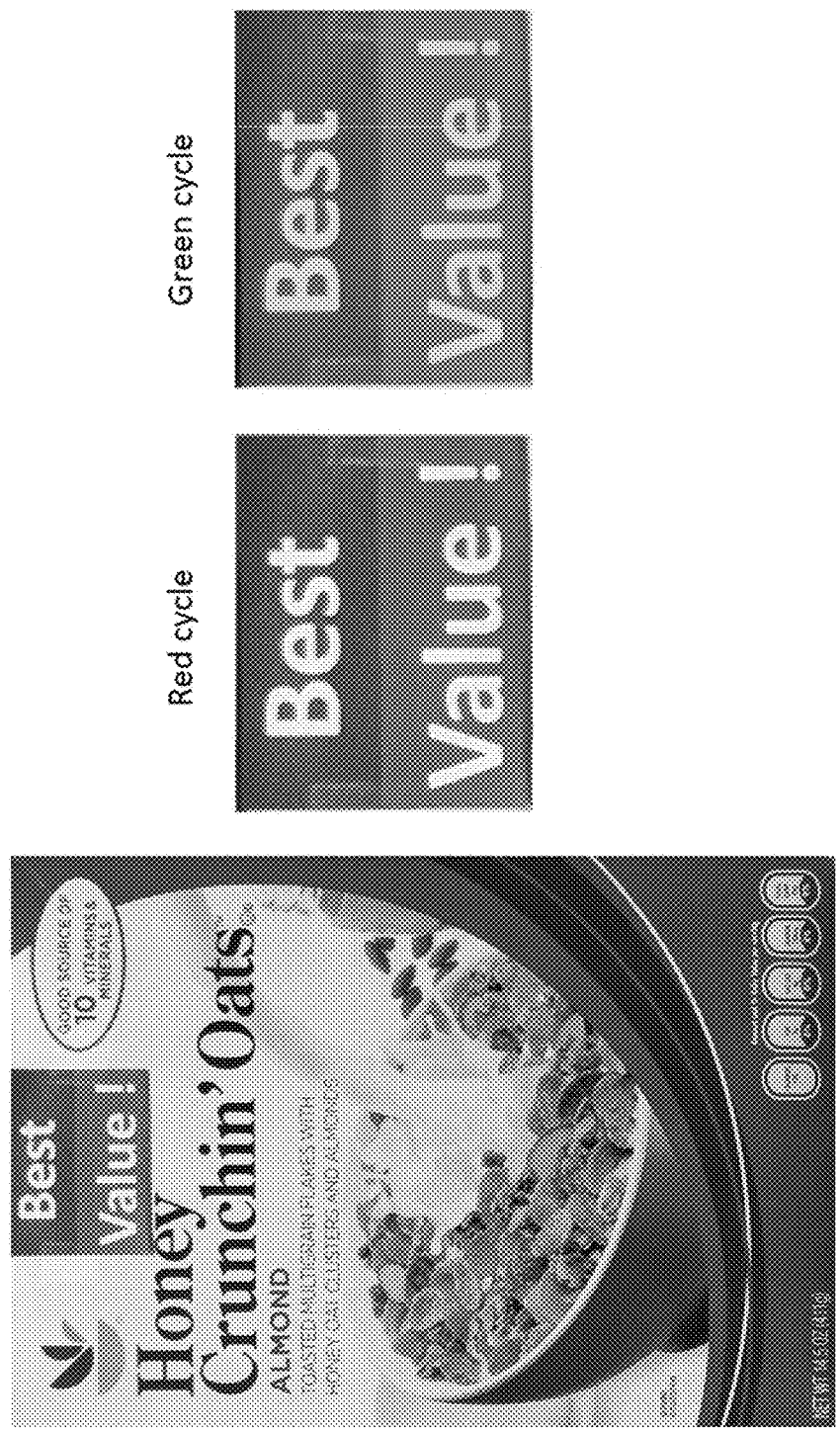
FIGS. 14A and 14B present color photographs illustrating color-rendered quasi-animation effects according to an embodiment as described in Example 8.
Figure 14B:

FIGS. 14A and 14B present images showing cycled RGBW illumination of red/green colored labels as an example of deliberate packaging design strategies that might leverage a predictable dynamic lighting condition to achieve quasi-animation effects. In FIG. 14A, the "Best Value" label was printed from a standard laser jet printer and taped to the cereal box. In FIG. 14B, the "Tastes Great!" label was also printed from a standard laser jet printer and taped to the cereal box. In both cases, the added labels were observed to pulse red, then green at a 'reading tempo' (approximately 1-2 seconds between color changes) in response to the cycled illumination. Shown in the figures are snapshots of the labels at the peak of red and green tinted illumination, respectively.

Example 9

Figure 15:
FIG. 15 presents color photographs illustrating color-rendered quasi-animation effects according to an embodiment as described in Example 9.

FIG. 15 presents images showing cycled RGBW illumination of a red/green/blue colored "decal", which was printed from a standard laser jet printer and taped to the cereal box as shown. The decal was observed to progressively brighten in direction of the color elements, showing first a red pulse, then green, then blue, (approximately 0.5-1 seconds between color changes) in response to the cycled illumination. Shown in the figure are snapshots of the decal at the peak of red, green and blue tinted illumination, respectively.

Example 10

Figure 16:
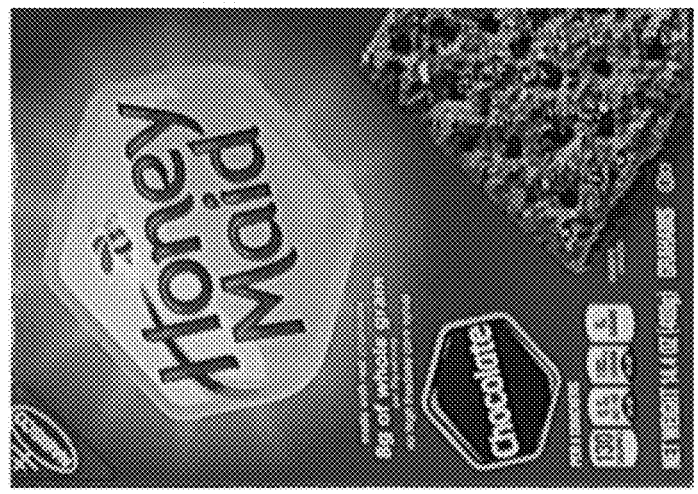
FIG. 16 presents color photographs illustrating color-rendered quasi-animation effects according to an embodiment as described in Example 10.
Figure 16:
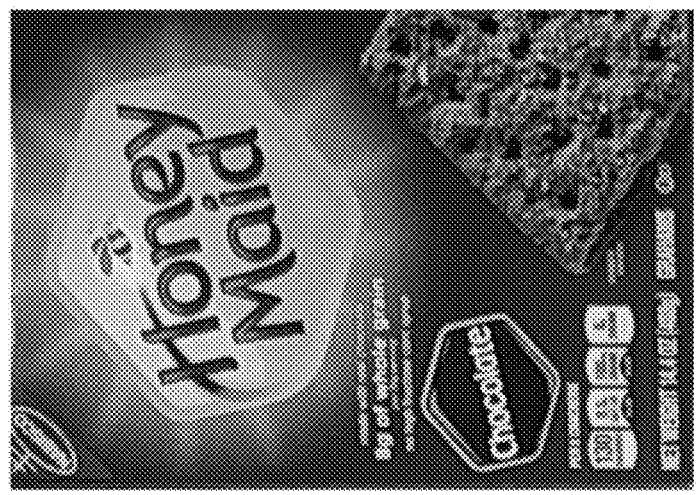
Figure 16:
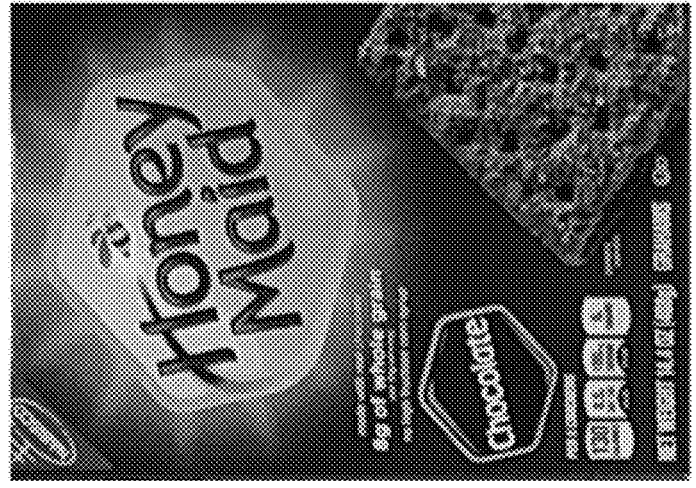

FIG. 16 presents images showing cycled RGBW illumination of a predominantly blue cereal box with an original large, yellow-gold label. This example demonstrates quasi-animation of an existing product packaging under the cycled lighting conditions. The six-sided, yellow-gold existing label and surrounding "halo" were observed to pulsate in response to the cycled illumination. FIG. 16 shows snapshots of the product at the peaks of red, green and blue tinted illumination, respectively. The quasi-animation described in FIG. 16 is generally compatible with a slower cycled lighting condition (approximately 4 seconds between color changes), however, the "reading tempo" quasi-animations of Example 8 and Example 9 might prefer a faster lighting cycle rate. Thus, it is to be noted that nothing prohibits use of a more complex RGB lighting cycle that for example, may mainly be a slower cycle rate that is compatible with "just noticeable" browsing enhancement, but occasionally includes a brief sequence of faster cycles to periodically execute quasi-animations that might otherwise be lying hidden.

As will be appreciated by those skilled in the art upon reading the present disclosure, the lighting methods and systems described herein are designed to intentionally skew what might otherwise be considered "true color rendering." As such, the described methods and systems are generally not intended for illumination of fresh produce food, fabric/clothing, or other items for which observers, such as shoppers, would likely specifically value a "true color rendering" experience. Rather, the methods and systems described herein are intended more to address products for which an intentional skewing of color rendering does not have an obvious direct functional link to after purchase appreciation of the actual product, typically product packaging situations in which the purchased product is presented in a separate packaging that does not form part of the product itself.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Example embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method for providing just noticeable color accentuation for a display of multi-colored items, comprising:
    illuminating the display with a tunable spectrum lamp; and
    controlling the tunable spectrum lamp to provide a periodic, repeating illumination cycle through different illumination spectra, the repeating illumination cycle having a period of not less than about 10 seconds.

2. The method of claim 1, wherein the period is in a range of about 10-24 seconds.

3. The method of claim 1, further comprising providing a substantially time constant ambient white light illumination with the repeating illumination cycle superimposed on the ambient white light illumination.

4. The method of claim 1, wherein the repeating illumination cycle cycles through a combination of different red, blue and green illumination spectra.

5. The method of claim 1, wherein the repeating illumination cycle falls within a predefined boundary area within a color space.

6. The method of claim 5, wherein the predefined boundary area is formed around a center point substantially corresponding to ambient white light illumination.

7. The method of claim 5, wherein the color space is CIE 1976 (L*, u*, v*) and the predefined boundary area has two opposing edges essentially parallel with a black body locus and two other opposing edges essentially parallel to a monochromatic perimeter of the color space.

8. The method of claim 7, wherein the black body locus extends between about 2500 K and about 12000 K.

9. The method of claim 7, wherein the predefined boundary area is defined by (u',v') points comprising (0.320, 0.530), (0.200, 0.560), (0.140, 0.490), and (0.220, 0.370).

10. The method of claim 1, wherein the illumination spectra of the repeating illumination cycle and the period are selected to cause an appearance of movement or flashing of predetermined color areas provided on items in the display.

11. The method of claim 10, wherein the predetermined color areas provided on the items comprise packaging labels or graphics.

12. The method of claim 10, wherein the repeating illumination cycle cycles through a combination of different red and green illumination spectra to cause the appearance of movement or flashing.

13. The method of claim 10, wherein the repeating illumination cycle cycles through a combination of different red, green, and blue illumination spectra to cause the appearance of movement or flashing.

14. A method for providing quasi-animation effects on a display of multi-colored items, comprising:
    illuminating the display with a tunable spectrum lamp;
    controlling the tunable spectrum lamp to provide a periodic, repeating illumination cycle through different illumination spectra, the repeating illumination cycle having a period of not less than about 12 seconds, wherein the repeating illumination cycle and the period are selected to cause an appearance of movement or flashing of labels or graphics with predetermined colors provided on items in the display; and
    providing a substantially time constant ambient white light illumination with the repeating illumination cycle is superimposed on the ambient white light illumination.

15. The method of claim 14, wherein the repeating illumination cycle cycles through a combination of different red and green illumination spectra to cause the appearance of movement or flashing.

16. The method of claim 14, wherein the repeating illumination cycle cycles through a combination of different red, green, and blue illumination spectra to cause the appearance of movement or flashing.

17. A system providing just noticeable color accentuation for displays of multi-colored items, comprising:
    a tunable spectrum light source;
    a light controller comprising a processor and memory, wherein the processor executes instructions stored in the memory for controlling the tunable spectrum light source to provide a periodic, repeating illumination cycle through different illumination spectra, the repeating illumination cycle having a period of not less than about 10 seconds.

18. The system of claim 17, further comprising an ambient white light source providing substantially time constant ambient white light illumination with the repeating illumination cycle superimposed on the ambient white light illumination.

19. The system of claim 18, wherein the tunable spectrum light source comprises at least two different blue light sources, at least two different green light sources, at least two different yellow light sources and at least two different red light sources, and wherein the instructions further comprise instructions for individually balancing the light sources to create a substantially constant white CIE xy color point, and cycling such that each spectrum takes a turn at illuminating the items.

20. The system of claim 18, wherein the instructions further comprise instructions for cycling the repeating illumination cycle through a combination of different red, blue and green illumination spectra, wherein the cycling illumination spectra fall within a predefined boundary area within a color space and the predefined boundary area is formed around a center point substantially corresponding to the ambient white light illumination.

* * * * *